US008354650B2

(12) United States Patent
Grosholz, Jr. et al.

(10) Patent No.: US 8,354,650 B2
(45) Date of Patent: Jan. 15, 2013

(54) MULTI-WINDOW SIGNAL PROCESSING ELECTRONICS ARCHITECTURE FOR PHOTON COUNTING WITH MULTI-ELEMENT SENSORS

(75) Inventors: Joseph Grosholz, Jr., Natrona Heights, PA (US); Paul O'Connor, Bellport, NY (US); Gianluigi Degeronimo, Syosset, NY (US)

(73) Assignees: Endicott Interconnect Technologies, Inc., Endicott, NY (US); Brookhaven Science Associates, LLC, Washington, DC (US)

( * ) Notice: Subject to any disclaimer, the term of this patent is extended or adjusted under 35 U.S.C. 154(b) by 922 days.

(21) Appl. No.: 12/282,607

(22) PCT Filed: Mar. 22, 2007

(86) PCT No.: PCT/US2007/007058
§ 371 (c)(1),
(2), (4) Date: Jan. 8, 2009

(87) PCT Pub. No.: WO2007/111912
PCT Pub. Date: Oct. 4, 2007

(65) Prior Publication Data
US 2009/0302232 A1 Dec. 10, 2009

Related U.S. Application Data

(60) Provisional application No. 60/785,401, filed on Mar. 22, 2006.

(51) Int. Cl.
G01T 1/00 (2006.01)
(52) U.S. Cl. .................................... 250/394; 250/336.1
(58) Field of Classification Search .................. 250/394, 250/370.11, 363.09, 336.1
See application file for complete search history.

(56) References Cited

U.S. PATENT DOCUMENTS

| 5,461,226 A | 10/1995 | Nicoli et al. |
| 2003/0173522 A1 | 9/2003 | Spartiotis |
| 2004/0188624 A1 | 9/2004 | Wong et al. |
| 2006/0071170 A1 | 4/2006 | Broennimann et al. |

Primary Examiner — David Porta
Assistant Examiner — Faye Boosalis
(74) Attorney, Agent, or Firm — Mark Levy; Hinman, Howard & Kattell, LLP

(57) ABSTRACT

A radiation detection and counting system (2) includes a radiation detector element (5) for outputting a signal related to an energy of a radiation event received thereby and an amplifier (8) for amplifying the signal output by the detector element (5). A gain equalization circuit (10) adjusts the gain of the amplified output signal and a plurality of comparators (12) compare the gain adjusted amplified output signal to a like plurality of different valued threshold signals that are independently adjustable of each other A plurality of counters (20) is operative whereupon only the counter associated with the one comparator (12) that changes state in response to the peak of the gain adjusted amplified output signal exceeding the value of the trigger threshold signal thereof is incremented. A storage (24) stores the incremented value of each counter (20) accumulated over a sample time interval and data output logic circuit (26) transfers the stored accumulated counts out of the storage.

16 Claims, 5 Drawing Sheets

MULTI-WINDOW SIGNAL PROCESSING ELECTRONICS ARCHITECTURE FOR PHOTON COUNTING WITH MULTI-ELEMENT SENSORS

BACKGROUND OF THE INVENTION

1. Field of the Invention

The present invention relates to radiation detectors and, more specifically, to a signal processing architecture therefore.

2. Description of the Related Art

Radiation counting detectors are well-known in the art, but suffer from a number of disadvantages, such as, without limitation, undesirable electronic noise, inability to accurately equalize the volts per keV that can be achieved between channels, the lack of adjustment that allows use of the signal processing electronics in a variety of applications, and the like.

Prior art patents in this area include, for example, U.S. Pat. Nos. 6,720,812; 6,333,648; 6,150,849; and 5,696,458, which are all incorporated herein by reference.

It would be desirable to overcome the above problems and others by providing a multi-window signal processing electronics architecture for counting radiation events received by a multi-element radiation detector. Still other advantages of the present invention will become apparent to those of ordinary skill. in the art upon reading and understanding the following detailed description.

SUMMARY OF THE INVENTION

The invention is a radiation detection and counting system. The system comprises a radiation detector element operative for outputting a signal having an amplitude related to an energy of a radiation event received thereby and an amplifier operative for amplifying the signal output by the detector element. A gain equalization circuit is operative for adjusting the gain of the amplified output signal and a plurality of comparators is operative for comparing the gain adjusted amplified output signal to a like plurality of different valued trigger threshold signals that are independently adjustable of each other. A plurality of counters is operative whereupon only the counter associated with the one comparator that changes state in response to the peak of the gain adjusted amplified output signal exceeding the value of the trigger threshold signal thereof is incremented.

The plurality of comparators can change state one-at-a-time in response to an increasing amplitude of the gain adjusted amplified output signal.

The system can further include means disposed between the plurality of comparators and the plurality of counters for causing only the counter associated with the one comparator that changes state in response to the peak of the gain adjusted amplified output signal exceeding the value of the trigger threshold signal thereof to be incremented.

The system can further include a storage. operative for storing the incremented value of each counter accumulated over a sample time interval. A data output logic circuit can be provided and operative for transferring each stored value out of the storage.

The sample time interval can commence and terminate in response to assertion and deassertion, respectively, of a counter enable signal. In response to assertion of the counter enable signal, the value of counter associated with the one comparator that changes state in response to the peak of the gain adjusted amplified output signal exceeding the value of the trigger threshold signal thereof can be incremented. In response to deassertion of the counter enable signal, the value stored in each counter can be transferred to the storage.

Each counter can commence incrementing from a starting value and, in response to deassertion of the counter enable signal, each counter can be reset to the starting value. The starting value can be 0.

The data output logic circuit can be responsive to a data enable signal for enabling the data output logic to transfer the value of each counter stored in the storage. The data output logic circuit can be responsive to each change in state of a data clock signal for transferring the value of one of the counters stored in the storage.

The system can further include a plurality of trimmer digital-to-analog converters (DACs), each of which can be operative for outputting one of the trigger threshold signals to one of the comparators. The system can further include a global threshold DAC operative for outputting a coarse trigger threshold signal to the plurality of trimmer DACs, each of which can be further operative for fine adjusting the coarse trigger threshold signal to obtain the corresponding trigger threshold signal which can be output to one of the comparators The combination of the radiation detector element, the amplifier, the gain equalization circuit, the plurality of comparators and the plurality of counters can comprise a single channel of the system. The system can include a plurality of said channels.

The invention is also a radiation detection and counting system that comprises a radiation detector having a plurality of radiation detector elements, each of which is operative for outputting a signal having an amplitude related to an energy of a radiation event received thereby; means for processing the signals output by the radiation detector elements independent of each other such that each processed signal has the same amplitude for a given energy of radiation event received by the corresponding detector element; means for comparing each processed signal to a unique set of different threshold signals, each of which is separately settable; means responsive to each processed signal for generating a signal related to the greatest value threshold signal that the peak value of the processed signal exceeds, but not related to any threshold signal having a value less than said greatest value threshold signal that the peak value of the processed signal exceeds; and means responsive to each generated signal for accumulating a count thereof.

The system can further include means for storing the accumulated count of each generated signal acquired over a sample time interval and means for transferring each stored accumulated count of each generated signal to a system controller.

The means responsive to each processed signal can be responsive to an increasing value thereof for generating the signal related to the greatest value threshold signal that the peak value of the processed signal exceeds. The means responsive to each generated signal can be responsive to a decreasing value of the processed signal for accumulating the count of the generated signal.

The system can further include a plurality of trimmer digital-to-analog converters (DACs), each of which can be operative for outputting one of the separately settable threshold signals. The system can further include a global threshold DAC operative for outputting a coarse threshold signal to the plurality of trimmer DACs, each of which can be further operative for fine adjusting the coarse threshold signal to obtain the corresponding separately settable threshold signal.

Lastly, the invention is a radiation detection and counting system that comprises: N amplifiers operative for amplifying signals output by N radiation detectors; N gain equalization circuits operative for equalizing the gains of the N amplified output signals whereupon each gain equalized output signal has the same amplitude in response to the corresponding radiation detector receiving a given energy radiation event; N sets of M trimmer digital-to-analog converters (DACs), each set of M trimmer DACs outputting M different value signals; N sets of M comparators, each set of M comparators responsive to the gain equalized output signals output by one of the gain equalization circuits and the M different value signals output by one of the sets of M trimmer DACs for outputting M comparator signals; and N sets of M counters, each set of M counters responsive to the M comparator signals output by one of the sets of M trimmer DACs for accumulating counts related to the peak values of the gain equalized output signals output by one of the gain equalization circuits.

The system can further include storage for storing the accumulated counts of the N sets of M counters acquired during a sample time interval and a data output logic circuit for transferring the stored accumulated counts out of the storage.

The system can further include N global threshold DACs, each of which outputs a corresponding coarse threshold signal to one of the sets of M trimmer DACs which can be responsive to said coarse threshold signal for outputting the M different value signals based on said coarse threshold signal.

DETAILED DESCRIPTION OF THE INVENTION

The present invention will be described with reference to the accompanying figures where like reference numbers correspond to like elements.

Figure 1:
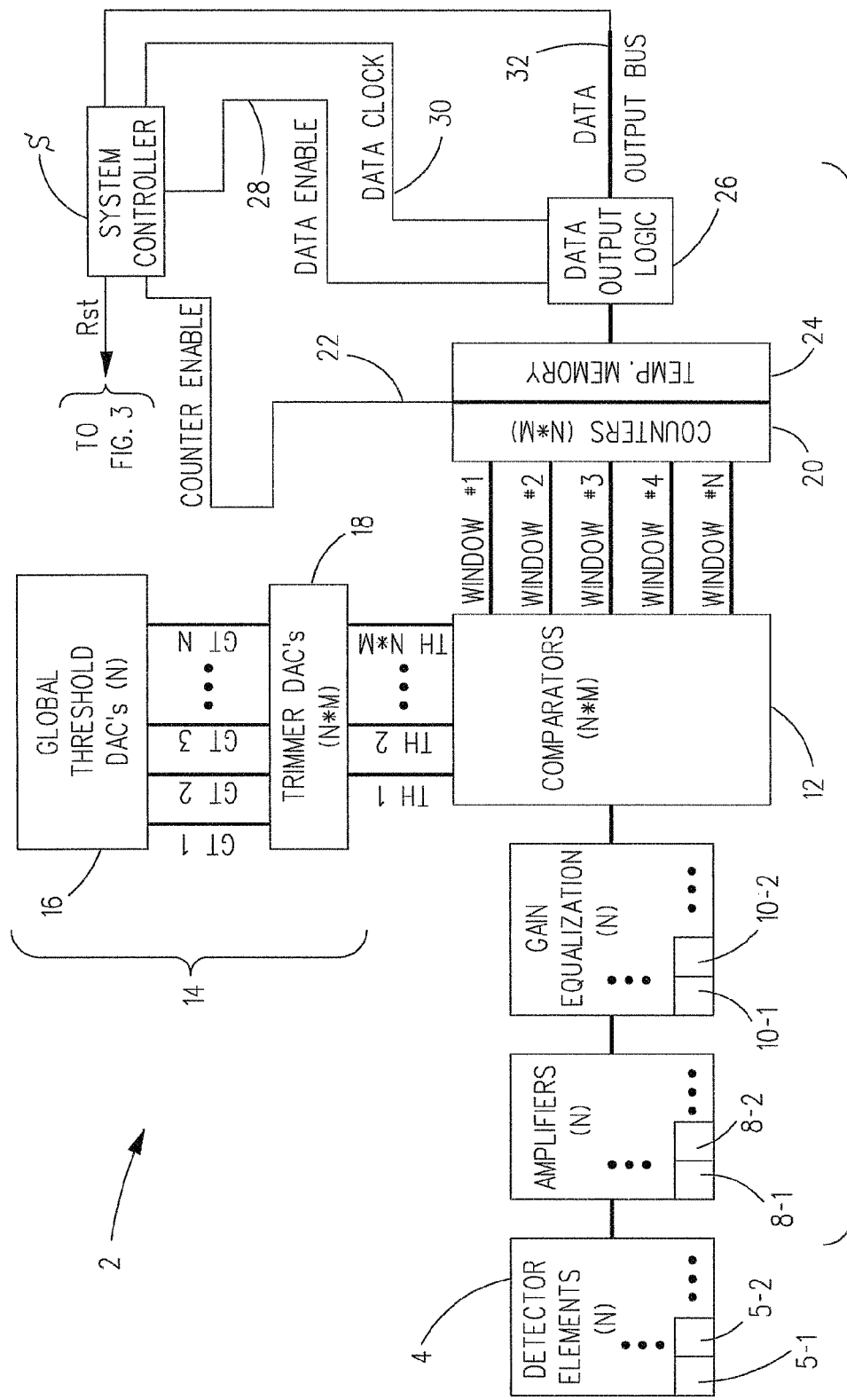
FIG. 1 is a block diagram of a signal processing electronics system including signal processing electronics in accordance with the present invention.

With reference to FIG. 1, the present invention is a multi-window signal processing electronics system 2, for counting X-ray or Gamma ray photons, that interact with a multi-element (pixel) radiation sensor 4. Advantages of system 2 include improved system performance, simple adjustment of individual channels to compensate for variations, and use of a single design in a variety of applications.

Radiation sensor 4 includes an array of N detector elements (or pixels) 5-1, 5-2, etc. When radiation, such as, without limitation, an X-ray, gamma ray or ionizing particle, strikes one of the detector elements 5, a charge is generated that is proportional to the energy of the radiation event. This charge generated by the radiation detector element is output thereby as a current or a voltage pulse. The radiation event is characterized by the data address of the detector element 5 in the array thereof which was struck and the energy of the radiation event. Signal processing electronics 6 determines this information for every radiation event for all of the detector elements, accumulates the number of radiation events occurring during sample intervals of time for all of the detector elements 5 into windows or frames, temporarily stores each window or frame in digital form and dispatches it to an external processing system, such as a system controller S.

For each detector element 5 of radiation sensor 4, signal processing electronics 6 includes an amplifier 8 which has an input connected to an output of the detector element 5. Each amplifier 8 amplifies each signal output by the corresponding detector element 5. The output of each amplifier 8 is coupled to an input of a corresponding gain equalization circuit 10. Each gain equalization circuit 10 can include any suitable and/or desirable arrangement of electronic components that enable adjustment of the output thereof whereupon the outputs of all the gain equalization circuits 10-1, 10-2, etc. are the same for a given energy radiation event received by each detector element 5-1, 5-2, etc., respectively. Thus, for example, in response to detector element 5-1 receiving a radiation event and detector 5-2 receiving a radiation event having the same value as the radiation event received by detector element 5-1, the outputs of gain equalization circuits 10-1 and 10-2 will be the same.

Each gain equalization circuit 10 has associated therewith M comparators 12, where M≧2. The output of each gain equalization circuit 10 is connected to one input of each of the M comparators 12, each of which has another input which is connected to one of M trigger threshold voltages, each of which desirably has a different trigger threshold voltage value. The trigger threshold voltages supplied to the M comparators associated with each equalization circuit 10 can originate in any suitable and/or desirable manner. In one desirable embodiment, the trigger threshold voltages supplied to the M comparators associated with each equalization circuit 10 originate in digital-to-analog converter (DAC) circuitry 14 that includes, without limitation, a combination of N global threshold DACs 16 and N*M trimmer DACs 18, each of the latter of which provides a trigger threshold voltage to one of the comparators 12 connected to the output of one of the gain equalization circuits 10.

Signal processing electronic 6 includes N*M counters. The output of each comparator 12 is connected to an input of a corresponding counter 20, the function of which will be described hereinafter.

Figure 2:
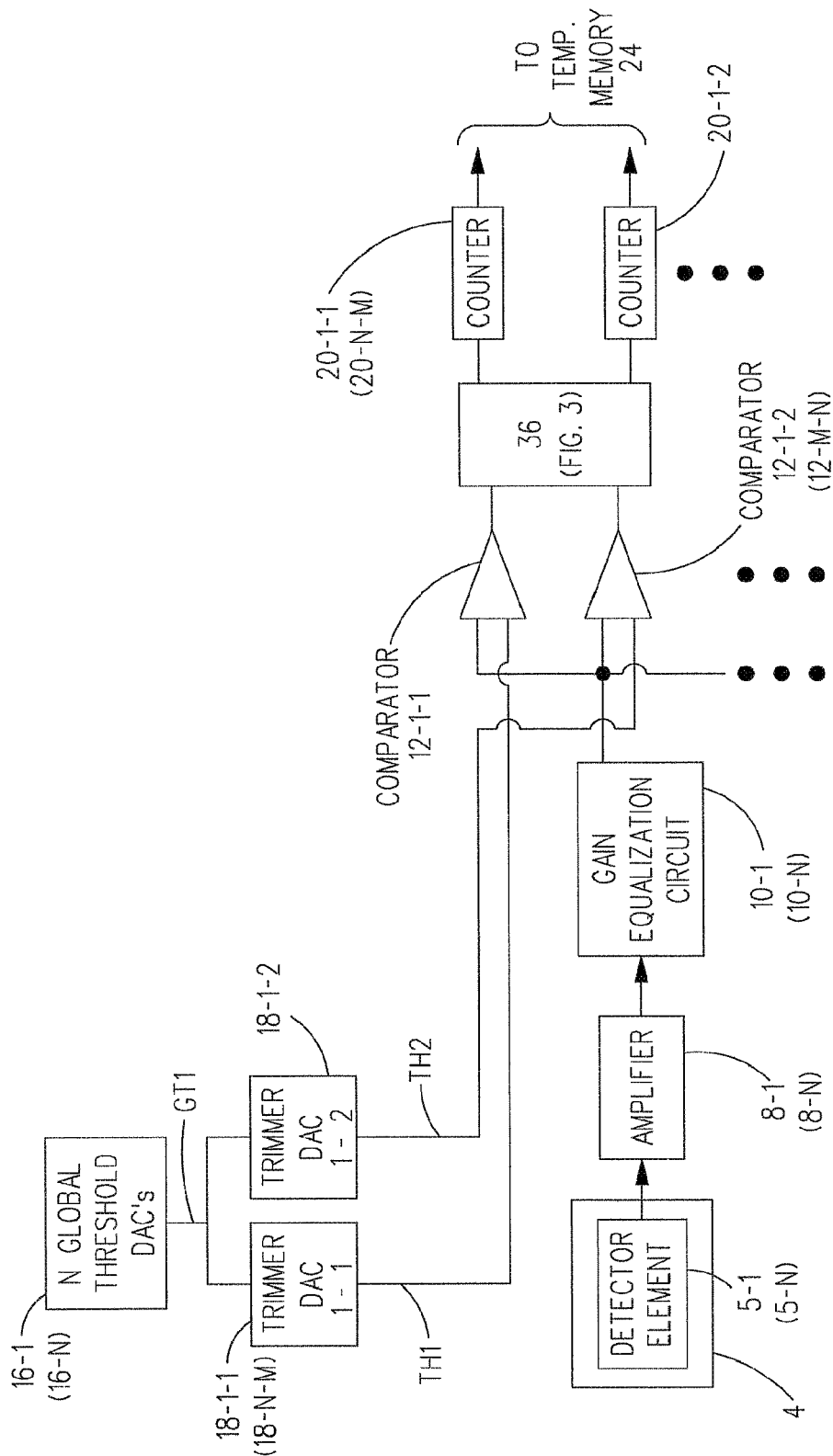
FIG. 2 is a block diagram of a portion of a single channel of part of the signal processing electronics shown in FIG. 1.

The processing of the output of a single detector element 5-1 of radiation sensor 4 will now be described with reference to FIG. 2 and with continuing reference to FIG. 1. When, in response to a voltage output by detector element 5-1, the corresponding gain equalization circuit 10-1 outputs (after amplification by amplifier 8-1) a pulse that exceeds the trigger threshold voltage TH1 applied to one input of a comparator 12-1-1 that has its other input connected to the output of gain equalization circuit 10-1, the output of said comparator 12-1-1 is asserted and an appropriate input is supplied to a corresponding counter 20-1-1 via the output of said comparator 12-1-1. If this pulse continues higher and exceeds another, e.g., the next, higher trigger threshold voltage TH2 applied to another, e.g., the next, comparator 12-1-2 having its input connected to the output of gain equalization circuit 10-1, the output of said next comparator 12-1-2 becomes asserted, the output of comparator 12-1-1 becomes deasserted, and an appropriate input is supplied via the output of 12-1-2 to a corresponding (another) counter 20-1-2.

Where amplifier 8-1 and gain equalization circuit 10-1 have plural comparators 12 and plural counters 20 associated therewith, the counter 20 associated with the comparator 12 that detects the peak voltage output by gain equalization circuit 10-1 will be incremented when the voltage output thereby falls below the trigger threshold voltage TH applied to said comparator 12. Suitable circuitry can be provided by one skilled in the art so that only the counter 20 associated with the comparator 12 detecting the peak voltage output by gain equalization circuit 10-1 is incremented. An exemplary, non-limiting embodiment of such circuitry is shown by reference number 36 in FIG. 3.

Figure 3:
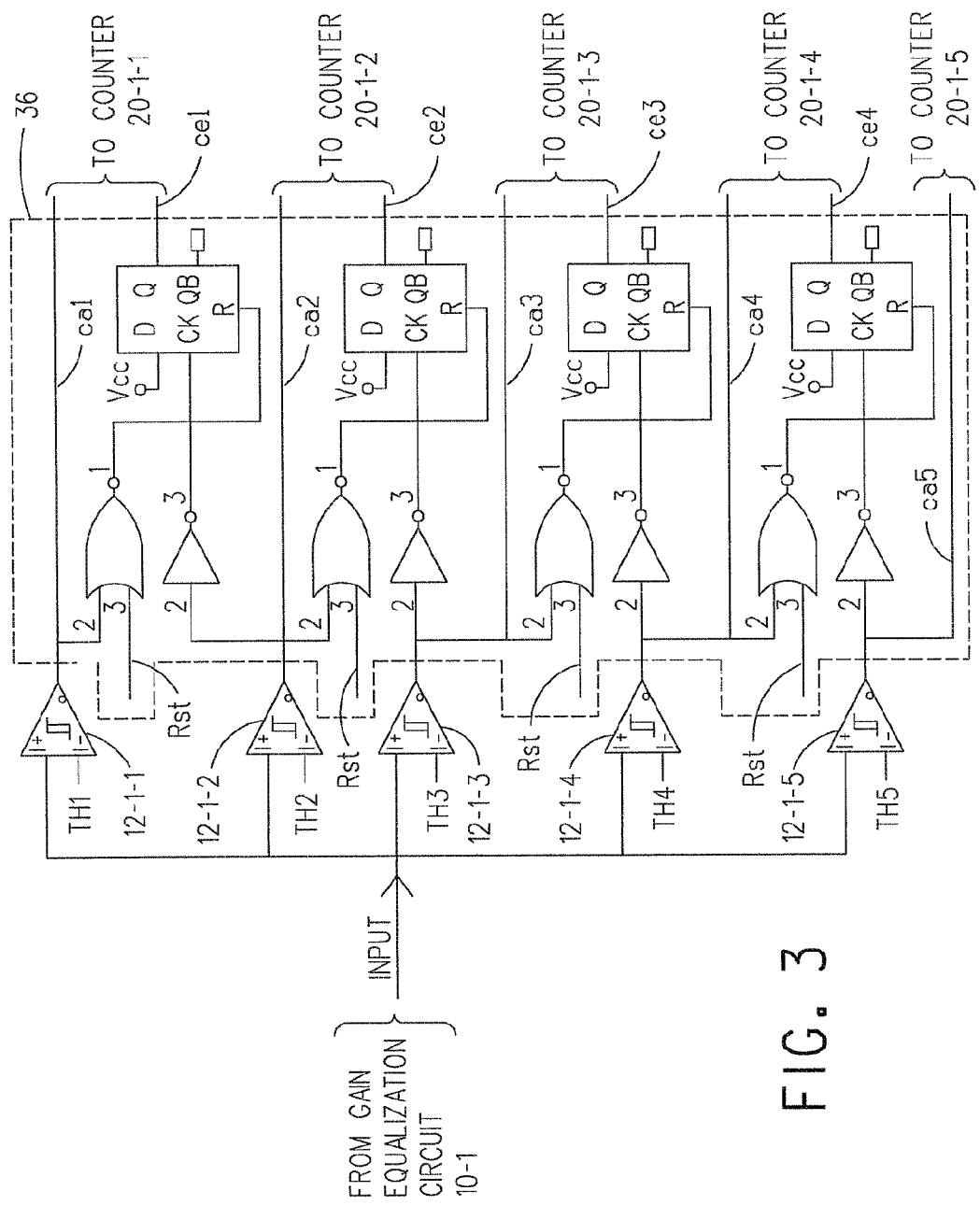
FIG. 3 is exemplary circuitry for outputting a signal related to the greatest value threshold signal that a peak value of a signal from a gain equalization circuit exceeds, but not related to any threshold signal having a value less than the greatest value threshold signal that the peak value of the signal from the gain equalization circuit exceeds.

In FIG. 3, TH1-TH5 are thresholds, ca1-ca5 are counter advance triggers, each of which upon the occurrence of the falling edge thereof will increase the value of the corresponding counter, and ce1-ce4 are counter enable signals. In the embodiment of circuitry 36 shown in FIG. 3, counter 20-1-5 is always enabled. In connection with circuitry 36, "enable" means enabled to advance when its trigger signal arrives.

When the output of gain equalization circuit 10-1 exceeds threshold TH1, the output of comparator 12-1-1 goes high, thereby setting cal high and ce1 high. If the output of gain equalization circuit 10-1 exceeds threshold TH2, ca2 and ce2 both go high and ce1 is reset low. This process is repeated until the peak value of the output of gain equalization circuit 10 is reached. Hence, only the counter higher in order is enabled. When the input from gain equalization circuit 10-1 starts falling (after the peak pulse), the comparator 12 output returns to low, lowering all counter advance triggers previously set high and triggering all the corresponding counter advance triggers. However, only the counter currently enabled, which is the highest in order, will actually be advanced. The counters having their counter enable ce signals not enabled are not advanced. In this way, an accurate count value can be generated for each window or frame.

The sample interval of time the plural counters 20 are active for each window or frame is determined by a counter enable signal 22 received from a system controller S. When counter enable signal 22 is enabled during a sample interval of time, all of the counters 20-N-M are active. When counter enable signal 22 changes state to not enabled, the data stored in counters 20-N-M during the sample interval of time said counters are active is transferred to a temporary memory or storage 24 and the counters 20-N-M are reset to a starting value, e.g., 0. Re-enabling the counter enable signal 22 again will enable the counters 20-N-M to start counting again.

At the conclusion of each sample interval of time, the count data stored in temporary storage 24 for each counter 20 is transmitted to system controller S. This process is facilitated by a data output logic circuit 26 under the control of a data enable signal 28 and a data clock signal 30 output by system controller S. Specifically, when data enable signal 28 is enabled, the output of data output logic circuit 26 switches from a tri-state mode and is ready to be driven. On the first falling edge of data clock signal 30, the first counter value, e.g., the value of counter 20-1-1, stored in temporary storage 24 for first detector element 5-1 is transferred to system controller S via a data bus 32. This first counter value can be read by system controller S and stored thereby. On the next falling edge of data clock signal 30, the second counter value, e.g., the value of counter 20-1-2, stored in temporary storage 24 for first detector element 5-1 is transferred to system controller S via data bus 32. This process is repeated until all of the 20-N-M, e.g., the N*M, counter values stored in temporary storage 24 are transferred to system controller S. Data enable signal 28 can then change state 40 to not enabled to place the data output bus 30 back in the tri-state mode and the data clock signal 30 is stopped. Once the next sample interval of time has ended, the process of transferring the data stored in temporary storage 24 can be repeated.

The present invention also includes provisions for equalizing the gain of each amplifier 8 and trigger threshold voltage setting of the M levels for each detector element 5. Specifically, the fine gain of each amplifier 8 can be adjusted via the corresponding gain equalization circuit 10 whereupon the outputs of all the gain equalization circuits 10 are the same for a given energy photon or ionizing particle striking the corresponding detector element 5. Thus, for example, for a given energy X-ray, gamma ray, or ionizing particle striking detector elements 5-1 and 5-2, the output of like comparators servicing each detector element 5-1 and 5-2 will be asserted. For example, if the energy of the photon or ionizing particle striking detector element 5-1 is sufficient to cause the output of comparator 12-1-2 to become asserted, a like energy photon or ionizing particle striking detector element 5-2 will cause the corresponding comparator 12-2-2 to also be asserted.

By way of the N global threshold DACs 16 and the N*M trimmer DACs 18, the N*M trigger threshold voltages TH can be individually adjusted to equalize the threshold voltage TH input into each comparator 12 to the energy of the photon or ionizing particle striking the corresponding detector element 5. By using these gain and trigger threshold voltage adjustments, the system can be accurately calibrated.

As can be seen, signal processing electronics 6 includes, without limitation, N amplifiers 8, N gain equalization circuits 10, N*M comparators 12, M global threshold DACs 16, N*M trimmer DACs 18, N*M counters 20, temporary storage 24 and data output logic circuit 26. It is-believed that this combination of parts defines a novel and non-obvious system with unique capabilities.

The use of a gain equalization circuit 10 for each combination of amplifier 8 and detector element 5 enables accurate calibration of the overall system. This feature can also be used to compensate for gain differences between detector elements 5 of radiation sensor 4. With these differences removed from the system, a more accurate calibration of the system can be achieved.

The use of a unique trigger threshold voltage TH that is independent for each comparator 12 threshold input also enables accurate calibration of the overall system. This feature can be used to compensate for comparator offset differences and gain linearity differences of the corresponding detector element 5, amplifier 8 and gain equalization circuit 10. With these differences removed from the system, a more accurate calibration of the system can be achieved.

The combination of the fine gain adjustments, provided by the gain equalization circuits 10, and the fine threshold adjustments, provided by the N*M trigger threshold voltages TH, allows a very accurate calibration of the system to the energy (in keV) of photon or ionizing particles striking each detector element 5. More specifically, for a given energy radiation event, the fine gain adjustments and the fine threshold adjustments enable each counter 20 associated with a corresponding detector element 5 to count the same number of counts as a corresponding counter associated with another detector element 5. This results in higher data integrity and better imaging capability.

The use of counter enable signal 22 to control the amount of time system 2 is counting or not counting radiation events allows system 2 to be used in a variety of applications. This provides flexibility for system 2 to operate at short or long exposure times and can also be used to synchronize the counting time to other events, such as radiation source activation or to count only when the object to be examined is in a predetermined location.

The use of amplifiers 8, desirably high order uni-polar shaping amplifiers 8, to overcome ballistic deficit problems inherent in CZT X-ray counting systems has advantages in the performance of the system. Such amplifiers 8 allow the use of a longer signal peaking time so that the signals generated by the detector elements 5 of radiation sensor 4, e.g., a CZT detector, is collected by system 2. At the same time, the total pulse width is minimized in order to maximize the count throughput of the system. One exemplary, non-limiting embodiment of each amplifier 8 that can be implemented is shown in FIG. 4.

Figure 4A:
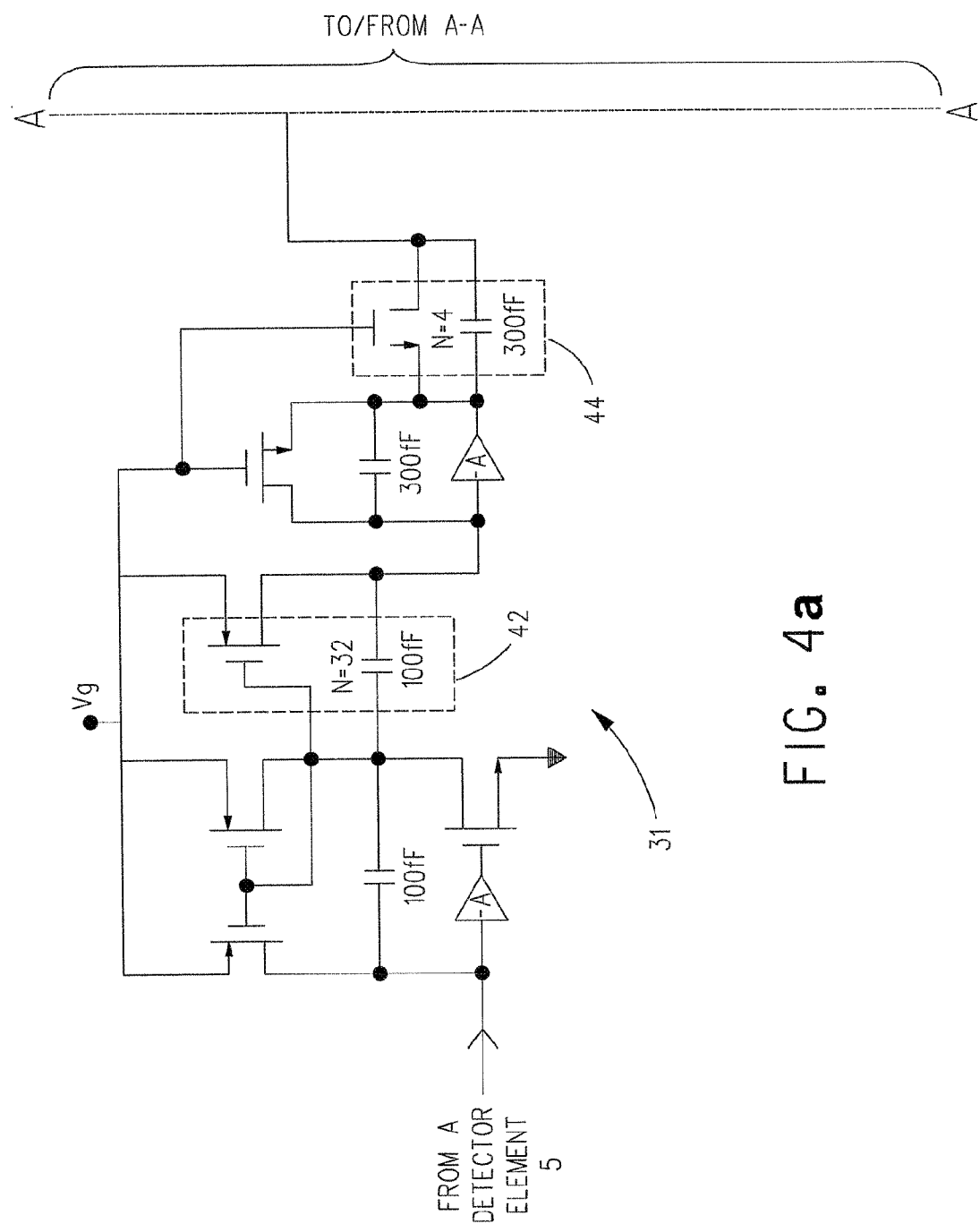
FIG. 4 is a schematic diagram of a single exemplary amplifier of the type shown in FIGS. 1 and 2.
Figure 4B:
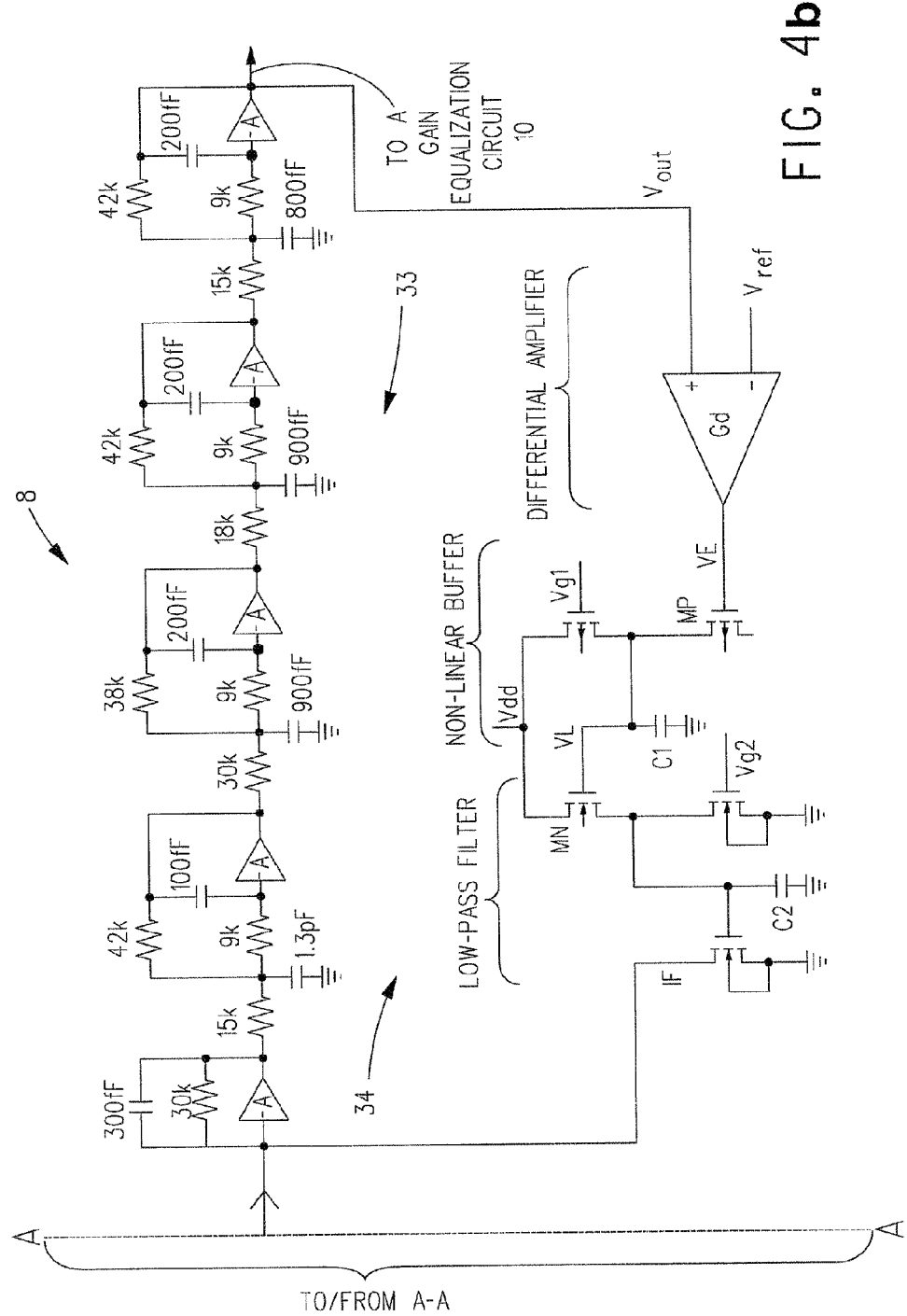

The embodiment of amplifier 8 shown in FIG. 4 includes a change-sensitive pre-amplifier 31, a shaping amplifier 33 and a baseline holder circuit 34. Details regarding the embodiment of charge sensitive pre-amplifier 31 shown in FIG. 4 can be found in G. De Geronimo, P. O° Connor and J. Grosholz, "A Generation Of CMOS Readout ASICs for CZT Detectors", IEEE Transactions On Nuclear Science, Vol. 7, Issue 6 Part 1, pp. 1857-1867 (December 2000). The embodiment of charge sensitive pre-amplifier 31 shown in FIG. 4 includes blocks 42 and 44 including "N=32" and "N=4", respectively. This means that charge sensitive pre-amplifier 31 includes thirty-two (32) instances of block 42 connected in series and four (4) instances of block 44 connected in series.

Details regarding the embodiment of shaping amplifier 33 shown in FIG. 4 can be found in S. Ohkawa, M. Yoshizava and K. Husimi, "Direct Synthesis Of The Gaussian Filter For Nuclear Pulse Amplifiers," Nuclear Instruments & Method, 138, (1976) pp. 85-92. The values of the capacitors and resistors in FIG. 4 were chosen to optimize the response of shaping amplifier 33 for a pulse peaking time of 40 nanoseconds. Different values of one or more capacitors and/or resistors of the embodiment of shaping amplifier 33 shown in FIG. 4 can be selected by one skilled in the art to optimize the response of amplifier 8 for different pulse peaking times.

Details regarding the embodiment of baseline holder circuit 34 shown in FIG. 3 can be found in G. De Geronimo, P. O'Connor and J. Grosholtz, "A CMOS Baseline Holder (BLH) For Readout ASICs", IEEE Transactions on Nuclear Science, 47 (2000) 1818-1822. In baseline holder circuit 34, the value of $V_{ref}$ determines the output to which $V_{out}$ is corrected to. Briefly, baseline holder circuit 34 provides a feedback signal needed to make $V_{ref}$ and $V_{out}$ equal. In baseline holder circuit 34, the values Vg1 and Vg2 can be selected by one of ordinary skill in the art to accomplish baseline holder circuit 34 making the values of $V_{ref}$ and $V_{out}$ equal.

An auxiliary analog output (not shown) can be provided on the output of each gain equalization circuit 10 to facilitate calibration and troubleshooting. For calibration, the analog signal output by each gain equalization circuit 10 can be used to characterize the gain thereof prior to trimming and equalizing the gain of all of the instances of detector element 5, amplifier 8 and gain equalization circuit 10. Capability to troubleshoot the system is enhanced with the auxiliary analog output because this gives a port in the middle of signal processing electronics 6.

Signal processing electronics 6 is expected to achieve very low electronic noise that will facilitate binning accuracy that surpasses the performance of prior art signal processing electronics. This advantage will be realized in improved image quality and detection of contaminant/substance of interest.

By using gain and trigger threshold voltage fine adjustments, an accurate equalization of counts accumulated by counters 20 per energy of photon or ionizing particles striking detector elements 5 can be achieved. This greatly simplifies the process of calibrating the sample interval of time in terms of said energy.

The use of selectable channel gains and signal peaking time enables signal processing electronics 6 to be used in a variety of applications. The prior art does not have this capability, therefore limiting its use to applications considered at the time the channel gain and peaking time are chosen.

Signal processing electronics 6 is also capable of simultaneous counting and data readout. This minimizes the amount of system dead time thereby maximizing the effective detector efficiency.

Signal processing electronics 6 is also capable of a wide range of counting periods through the use of the counter enable signal. For example, a counting period can be as short as one clock cycle or as long as desired.

The present invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A radiation detection and counting system comprising:
a radiation detector element for outputting a signal having an amplitude related to an energy of a radiation event received thereby;
an amplifier for amplifying the signal output by the radiation detector element;
a gain equalization circuit for adjusting the gain of the amplified output signal;
a plurality of comparators for comparing the gain adjusted amplified output signal to a like plurality of different valued trigger threshold signals independently adjustable of each other;
a plurality of trimmer digital-to-analog converters (DACs), each of which is operative for outputting one of the trigger threshold signals to one of said plurality of comparators;
a global threshold DAC operative for outputting a coarse trigger threshold signal to said plurality of trimmer DACs, each of which is further operative for fine adjusting the coarse trigger threshold signal to obtain the corresponding trigger threshold signal which is output to one of said plurality of comparators;
a plurality of counters operative whereupon only the counter associated with the one comparator that changes state in response to the peak of the gain adjusted amplified output signal exceeding the value of the trigger threshold signal thereof is incremented; and
storage means for storing the incremented value of each counter accumulated over a predetermined sample time interval.

2. The system of claim 1, wherein the plurality of comparators change state one-at-a-time in response to an increasing amplitude of the gain adjusted amplified output signal.

3. The system of claim 2, further including means disposed between the plurality of comparators and the plurality of counters for causing only the counter associated with the one comparator that changes state in response to the peak of the gain adjusted amplified output signal exceeding the value of the trigger threshold signal thereof to be incremented.

4. The system of claim 2, wherein each of said plurality of counters ceases to increment when one of said counters reaches its maximum capacity.

5. The system of claim 1, further including: a data output logic circuit for transferring each stored value out of the storage means at a predetermined time.

6. The system of claim 1, wherein: the sample time interval commences and terminates in response to assertion and desertion, respectively, of a counter enable signal; in response to assertion of the counter enable signal, the value of a counter associated with the one comparator that changes state in response to the peak of the gain adjusted amplified output signal exceeding the value of the trigger threshold signal thereof is incremented; and in response to desertion of the counter enable signal, the value stored in each counter is transferred to the storage means.

7. The system of claim 6, wherein: each counter commences incrementing from a starting value; and in response to desertion of the counter enable signal, each counter is reset to the starting value.

8. The system of claim 7, wherein the starting value is 0.

9. The system of claim 1, wherein: the data output logic circuit is responsive to a data enable signal for enabling the data output logic to transfer the value of each counter stored in the storage means; and the data output logic circuit is responsive to each change in state of a data clock signal for transferring the value of one of the counters stored out of the storage means.

10. The system of claim 1, wherein: the combination of the radiation detector element, the amplifier, the gain equalization circuit, the plurality of comparators and the plurality of counters comprise a single channel of the system; and the system includes a plurality of said channels.

11. A radiation detection and counting system comprising:
a radiation detector having a plurality of radiation detector elements, each of which is operative for outputting a signal having an amplitude related to an energy of a radiation event received thereby;
means for processing the signals output by the radiation detector elements independent of each other such that each processed signal has the same amplitude for a given energy of radiation event received by the corresponding radiation detector element;
means for comparing each processed signal to a unique set of different threshold signals, each of which threshold signals is separately settable;
a plurality of trimmer digital-to-analog converters (DACs), each of which is operative for outputting one of said set of threshold signals;
a global threshold DAC operative for outputting a coarse threshold signal to said plurality of trimmer DACs, each of which is further operative for fine adjusting the coarse threshold signal to obtain a corresponding threshold signal;
means responsive to each processed signal for generating a signal related to the greatest value threshold signal that the peak value of the processed signal exceeds, but not related to any threshold signal having a value less than said greatest value threshold signal that the peak value of the processed signal exceeds;
means responsive to each generated signal for accumulating a count thereof; and
storage means for storing the accumulated count over a predetermined sample time interval of each means for accumulating a count.

12. The system of claim 11, further including:
means for transferring each stored accumulated count of each generated signal out of said storage means at a predetermined time.

13. The system of claim 11; wherein: the means responsive to each processed signal is responsive to an increasing value thereof for generating the signal related to the greatest value threshold signal that the peak value of the processed signal exceeds; and the means responsive to each generated signal is responsive to a decreasing value of the processed signal for accumulating the count of the generated signal.

14. The system of claim 11, wherein said means responsive to each generated signal for accumulating a count thereof ceases to increment when said means for accumulating reaches its maximum capacity.

15. A radiation detection and counting system comprising: N amplifiers operative for amplifying signals output by N radiation detectors; N gain equalization circuits operative for equalizing the gains of the N amplified output signals whereupon each gain equalized output signal has the same amplitude in response to the corresponding radiation detector receiving a given energy radiation event; N sets of M trimmer digital-to-analog converters (DACs), each set of M trimmer DACs outputting M different value signals; N sets of M comparators, each set of M comparators responsive to the gain equalized output signals output by one of the gain equalization circuits and the M different value signals output by one of the sets of M trimmer DACs for outputting M comparator signals; N sets of M counters, each set of M counters responsive to the M comparator signals output by one of the sets of M trimmer DACs for accumulating counts related to the peak values of the gain equalized output signals output by one of the gain equalization circuits; N global threshold DACs, each of which outputs a corresponding coarse threshold signal to one of said sets of M trimmer DACs which is responsive to said coarse threshold signal for outputting the M different value signals based on said coarse threshold signal, and storage means for storing said accumulated counts acquired during a predetermined sample time interval.

16. The system of claim 15, further including a data output logic circuit for transferring the stored accumulated counts out of the storage means at a predetermined time.

* * * * *